United States Patent
Lippincott (10) Patent No.: US 7,292,730 B1
(45) Date of Patent: Nov. 6, 2007

(54) TWO-DIMENSIONAL INVERSE DISCRETE COSINE TRANSFORMING

(75) Inventor: Louis A. Lippincott, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 935 days.

(21) Appl. No.: 09/458,370

(22) Filed: Dec. 9, 1999

(51) Int. Cl.
  *G06K 9/36* (2006.01)
(52) U.S. Cl. ............... 382/233; 382/248; 382/250; 708/402; 375/240.2; 348/395.1; 348/403.1
(58) Field of Classification Search ........... 382/233, 382/248, 250; 708/402; 375/240.2, 240.25; 348/395.1, 403.1
See application file for complete search history.

(56) References Cited

U.S. PATENT DOCUMENTS

| | | | |
|---|---|---|---|
| 4,760,543 A * | 7/1988 | Ligtenberg et al. ......... | 708/400 |
| 4,791,598 A * | 12/1988 | Liou et al. ................ | 708/402 |
| 4,829,465 A * | 5/1989 | Knauer ..................... | 708/402 |
| 5,181,183 A * | 1/1993 | Miyazaki .................. | 708/402 |
| 5,268,853 A * | 12/1993 | Tanaka et al. ............. | 708/401 |
| 5,412,740 A * | 5/1995 | Fadavi-Ardekani ......... | 382/293 |
| 5,471,412 A * | 11/1995 | Shyu ....................... | 708/402 |
| 5,481,487 A * | 1/1996 | Jang et al. ................ | 708/401 |
| 5,541,658 A * | 7/1996 | Ishiwata .................. | 348/394.1 |
| 5,568,278 A * | 10/1996 | Nakano et al. ............ | 382/248 |
| 5,737,256 A * | 4/1998 | Nakagawa et al. ......... | 708/400 |
| 6,011,498 A * | 1/2000 | Wittig ..................... | 341/67 |
| 6,628,714 B1 * | 9/2003 | Fimoff et al. ............ | 375/240.16 |

* cited by examiner

*Primary Examiner*—Matthew C. Bella
*Assistant Examiner*—Patrick Edwards
(74) *Attorney, Agent, or Firm*—Alan Pedersen-Giles (57) ABSTRACT

Implementing a two-dimensional inverse discrete cosine transform function includes executing two one-dimensional inverse discrete cosine transforming functions. Each of the one-dimensional functions is controlled to operate on a matrix of coefficients in either of two different directions.

13 Claims, 10 Drawing Sheets

|   |   |   |   |
|---|---|---|---|
| 1 | 5 | 9  | 13 |
| 2 | 6 | 10 | 14 |
| 3 | 7 | 11 | 15 |
| 4 | 8 | 12 | 16 |

FIG. 4

PRIOR ART

|   |   |   |   |
|---|---|---|---|
| 1 | 2 | 3 | 4 |
| 5 | 6 | 7 | 8 |
| 9 | 10 | 11 | 12 |
| 13 | 14 | 15 | 16 |

FIG. 5

PRIOR ART

TWO-DIMENSIONAL INVERSE DISCRETE COSINE TRANSFORMING

BACKGROUND

This invention relates to two-dimensional inverse discrete cosine transforming.

Image compression techniques such as JPEG (joint photographic experts group) and MPEG (moving pictures experts group) use inverse discrete cosine transforms (IDCT) in decompressing images. The one-dimensional (1D) IDCT function is:

$$x(n) = \sum_{k=0}^{N-1} c(k)y(k)\cos\left[\frac{\pi(2k+1)i}{2N}\right],$$

$$1 \leq k \leq N-1, c(k) = \begin{cases} \frac{1}{\sqrt{N}} & k = 0 \\ \sqrt{\frac{2}{N}} & 1 \leq k \leq N \end{cases}$$

Decompressing can also be done in two dimensions using two-dimensional (2D) IDCTs. The 2D IDCT is:

$$x(i,j) = \sum_{s=0}^{S-1}\sum_{t=0}^{T-1} c(s,t)d(s,t)y(s,t)\cos\left[\frac{\pi(2s+1)i}{2S}\right]\cos\left[\frac{\pi(2t+1)j}{2T}\right],$$

$$1 \leq s \leq S-1, 1 \leq t \leq T-1,$$

$$c(s,t) = \begin{cases} \frac{1}{\sqrt{S}} & i = 0, j = 0 \\ \sqrt{\frac{2}{S}} & 1 \leq i \leq S-1, 1 \leq j \leq S-1 \end{cases}$$

$$d(s,t) = \begin{cases} \frac{1}{\sqrt{T}} & i = 0, j = 0 \\ \sqrt{\frac{2}{T}} & 1 \leq i \leq T-1, 1 \leq j \leq T-1 \end{cases}$$

Figure 1:
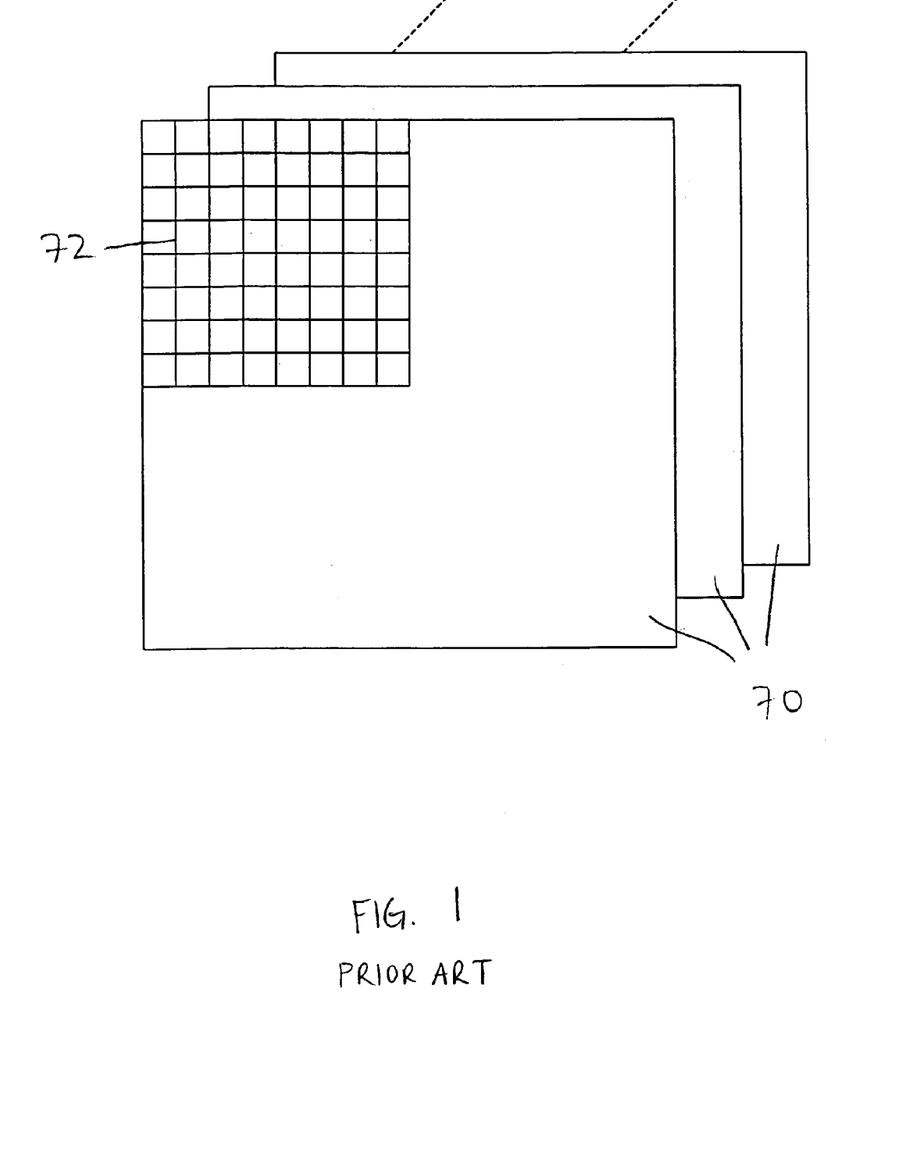
FIG. 1 is a diagram of a succession of images.
Figure 2:
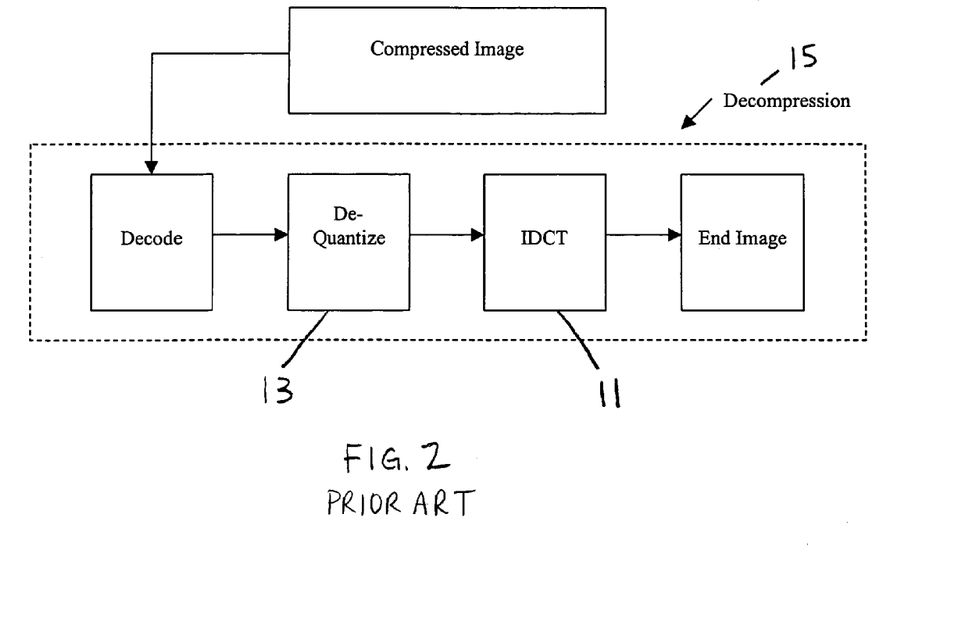
FIG. 2 is a block diagram of an image decompression process.

As shown in FIGS. 1 and 2, a decompression process 15 may be performed on a succession of images 70, e.g., video images, each image 70 broken into a sequence of one or more pixel blocks 72, e.g., 8×8 pixel blocks. An IDCT function 11 (implementing the 1D and/or 2D equation above) does not work directly on each pixel block 72 in each image, but on a sequence of matrices, e.g., 8×8 matrices of integer coefficients, associated with respective pixel blocks 72 and delivered from a de-quantizer block 13 (another part of the decompression process 15).

SUMMARY

In general, in one aspect, the invention features implementing a two-dimensional inverse discrete cosine transform function by executing two one-dimensional inverse discrete cosine transforming functions. Each of the one-dimensional functions is controlled to operate on a matrix of coefficients in either of two different directions.

In another aspect, the invention features concurrently executing the two one-dimensional inverse discrete cosine transforming functions in opposite directions.

In another aspect, the invention features implementing a two-dimensional inverse discrete cosine transform with two one-dimensional inverse discrete cosine transform blocks, a memory block, a sequencer block, and an address generator block. The sequencer block is alternately in one of two states, each state indicating the direction in which each one-dimensional inverse discrete cosine transform block operates. The two-dimensional inverse discrete cosine transform may be implemented on a computer system having a processor.

In another aspect, the invention features implementing a two-dimensional inverse discrete cosine transform by executing two one-dimensional inverse discrete cosine transforming functions to operate on a sequence of matrices. Some matrices are operated on first in row order, then in column order and some matrices are operated on first in column order, then in row order.

Other advantages and features will be appreciated from the following description.

DESCRIPTION

In one known 2D IDCT method, one 2D IDCT function (using the 2D IDCT equation above) is performed on an 8×8 (S×T, using the variables in the 2D IDCT equation above) matrix of integer coefficients (y(s,t) in the 2D IDCT equation above). This method essentially performs a 1D IDCT in one dimension (the dimension associated with T in the 2D IDCT equation above), followed by a 1D IDCT in the other dimension (the dimension associated with S in the 2D IDCT equation above).

Figure 3:
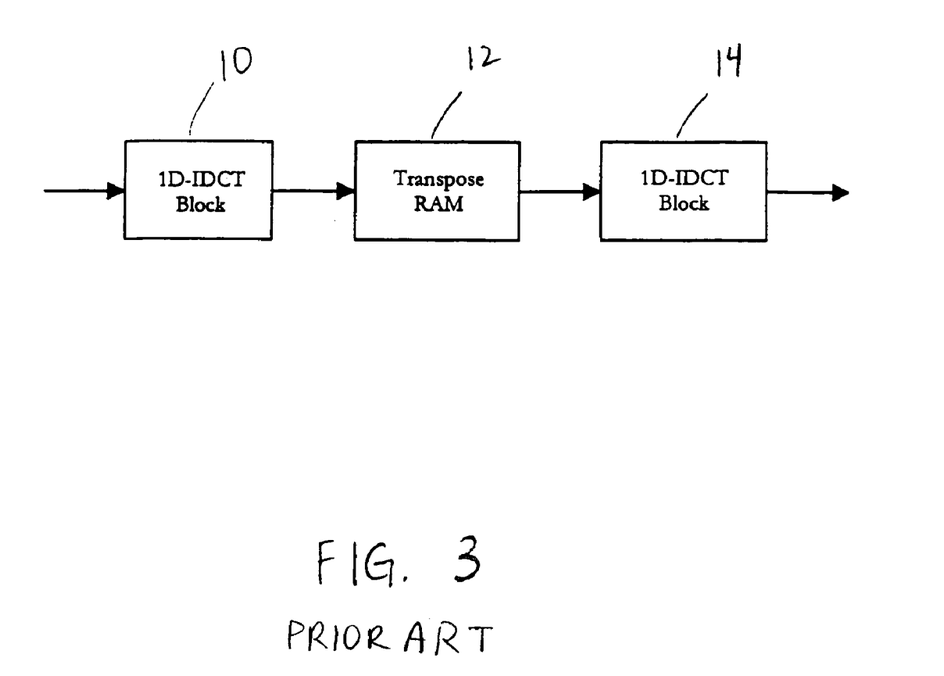
FIG. 3 is a block diagram of a two-dimensional inverse discrete cosine transforming function.
Figure 4:
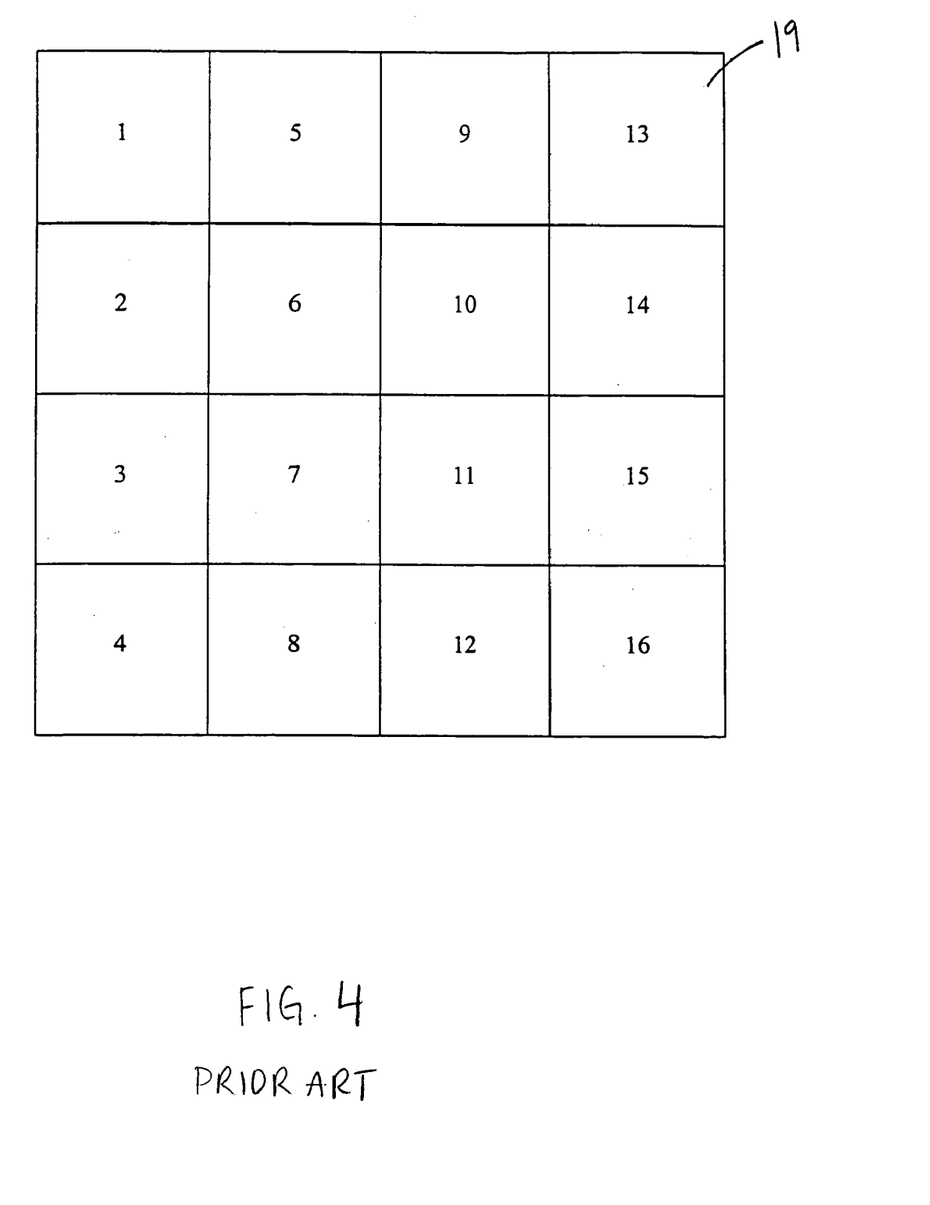
FIG. 4 is a diagram illustrating column ordering.
Figure 5:
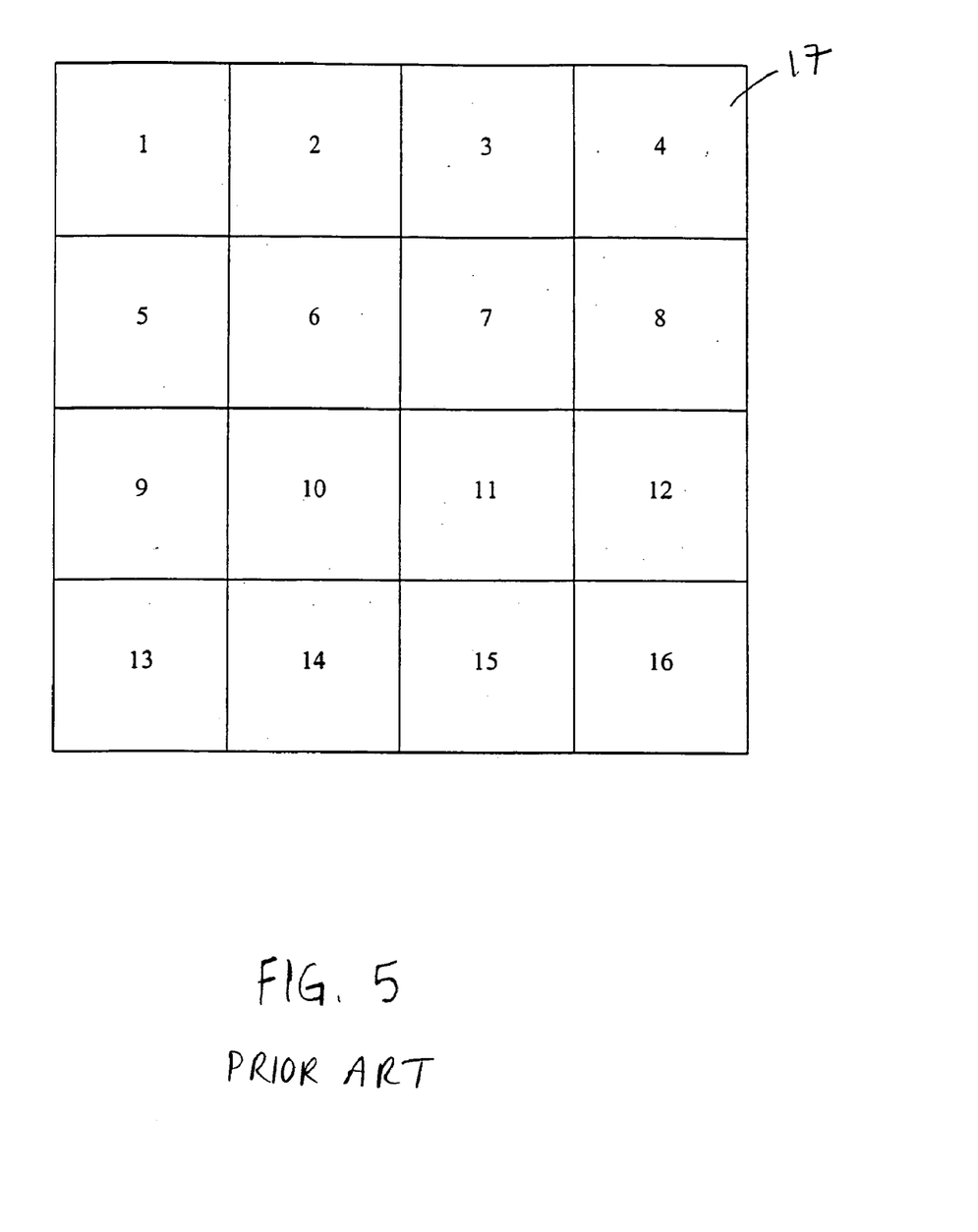
FIG. 5 is a diagram illustrating row ordering.

As seen in FIG. 3, another known 2D IDCT method includes breaking down the 2D IDCT function into two 1D IDCT functions 10 and 14. The first IDCT block 10 (implementing the 1D IDCT equation above) performs the first IDCT function on a matrix of coefficients in column order. To simplify the discussion, assume that the first IDCT block 10 works on a 4×4 matrix of integer coefficients (y(k) in the 1D IDCT equation above), for a total of sixteen (N in the 1D IDCT equation above) coefficients. Each coefficient is operated on sequentially in column order as shown in FIG. 4. In FIG. 4, a complete column of data is operated on before moving to the next column of data. The first IDCT block 10 writes each result (the intermediate result, x(n) in the 1D IDCT equation above) in the same sequential column order in a transposition RAM (random access memory) block 12. Only after the first IDCT block 10 stores the last intermediate result in RAM block 12 can the second IDCT block 14 begin processing the intermediate results in row order. The second IDCT block 14 (which implements the 1D IDCT equation above) performs the second IDCT function on the intermediate results (y(k) in the 1D IDCT equation above), in sequential row order as shown in FIG. 5. In FIG. 5, a complete row of data is operated on before moving to the next row of data. The second IDCT block 14 outputs each final result (one computed pixel, x(n) in the 1D IDCT equation above) in the same sequential row order.

The first IDCT block 10 and second IDCT block 14 cannot overlap (operate in parallel) because the second IDCT block 14 needs data on its first row at a coefficient 17, see FIG. 5, that is not generated until the first IDCT block 10 is on its last column at a coefficient 19, see FIG. 4. This data dependency limits the throughput (speed with which a computer processes data) of the method in FIG. 3. Throughput becomes critical given the number of images in succession and the number of matrices per image that the IDCT blocks 10 and 14 must process, especially for high-resolution images composed of many pixels, such as high definition television (HDTV) material.

Figure 6:
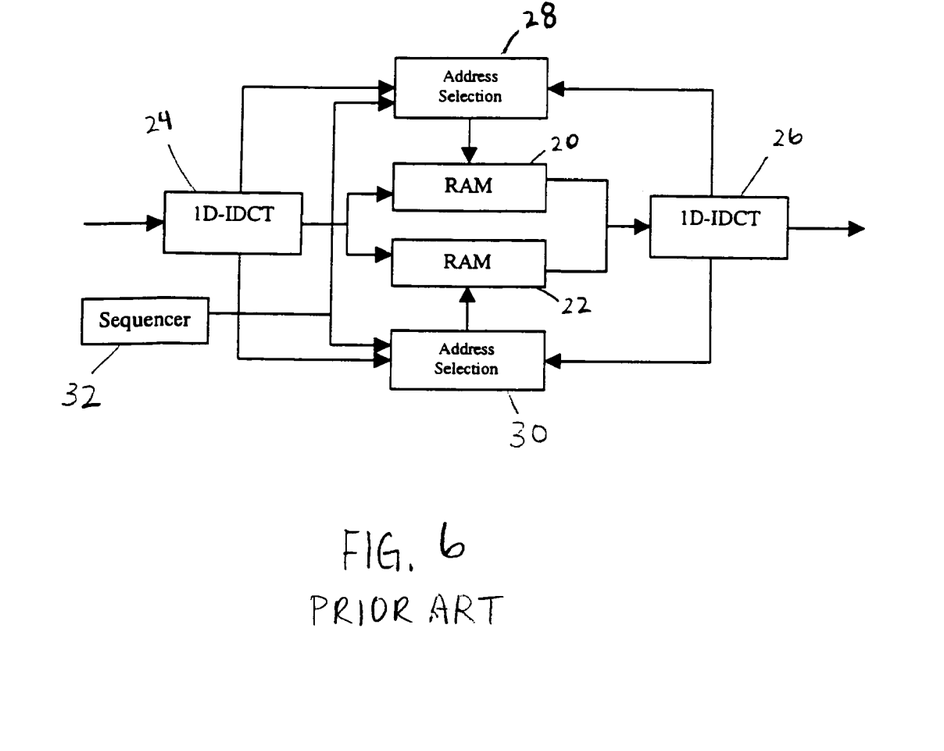
FIG. 6 is a block diagram of a two-dimensional inverse discrete cosine transforming function.

Referring to FIG. 6, another known 2D IDCT method improves throughput by using two transposition RAM blocks 20 and 22, thereby allowing two 1D IDCT blocks 24 and 26 to operate in parallel. While the first IDCT block 24 (operating like first IDCT block 10) writes its results always in column order to RAM block 20 or 22, the second IDCT block 26 (operating like second IDCT block 14) reads the previous matrix's data from the other RAM block 20 or 22 always in row order. The IDCT blocks 24 and 26 know which RAM block 20 or 22 to access because of address selection blocks 28 and 30 and a sequencer 32. Address selection blocks 28 and 30 select the column addresses from the first IDCT block 24 or the row addresses from the second IDCT block 26 and pass them on to the connected RAM block 20 or 22 depending on the state of a sequencer 32. The sequencer 32 tracks which IDCT block 24 or 26 is controlling each RAM block 20 or 22. With two RAMs 20 and 22, the method can output one final result (one computed pixel) on every clock.

Figure 7:
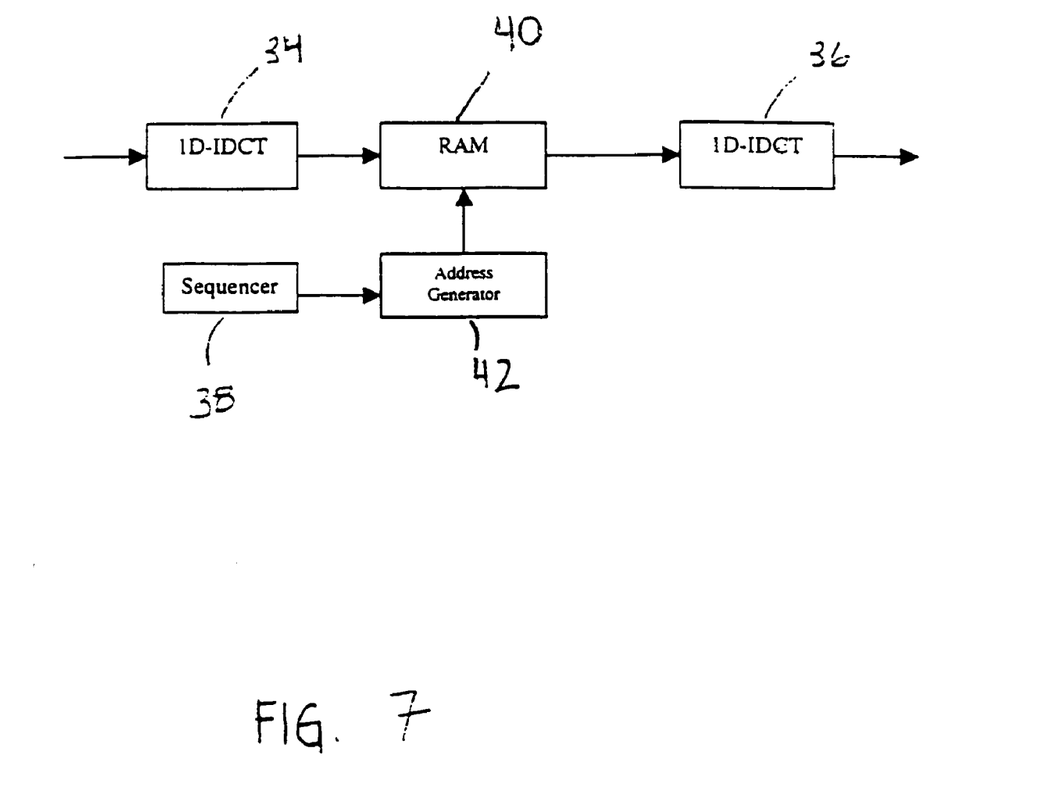
FIG. 7 is a block diagram of a two-dimensional inverse discrete cosine transforming function.

In one embodiment of the invention shown in FIG. 7, a 2D IDCT function is executed using two 1D IDCT blocks 34 and 36 (each implementing the 1D IDCT equation above) and one transposition RAM block 40. IDCT blocks 34 and 36 operate in parallel and are each capable of operating in row order and in column order. Toggling IDCT blocks 34 and 36 between row order operation and column order operation for a sequence of coefficient matrices allows every other matrix to be processed in column order first, then in row order and the intervening matrices to be processed in row order first, then in column order. Toggling the operation of IDCT blocks 34 and 36 reduces the amount of hardware necessary to perform a 2D IDCT function because only one RAM 40 and associated circuitry is needed. It also improves throughput because each IDCT block 34 and 36 can operate in two directions, i.e., IDCT block 34 need not wait for IDCT block 36 to finish processing a matrix in row (or column) order before it can process the next matrix in the sequence in column (or row) order.

Figure 8:
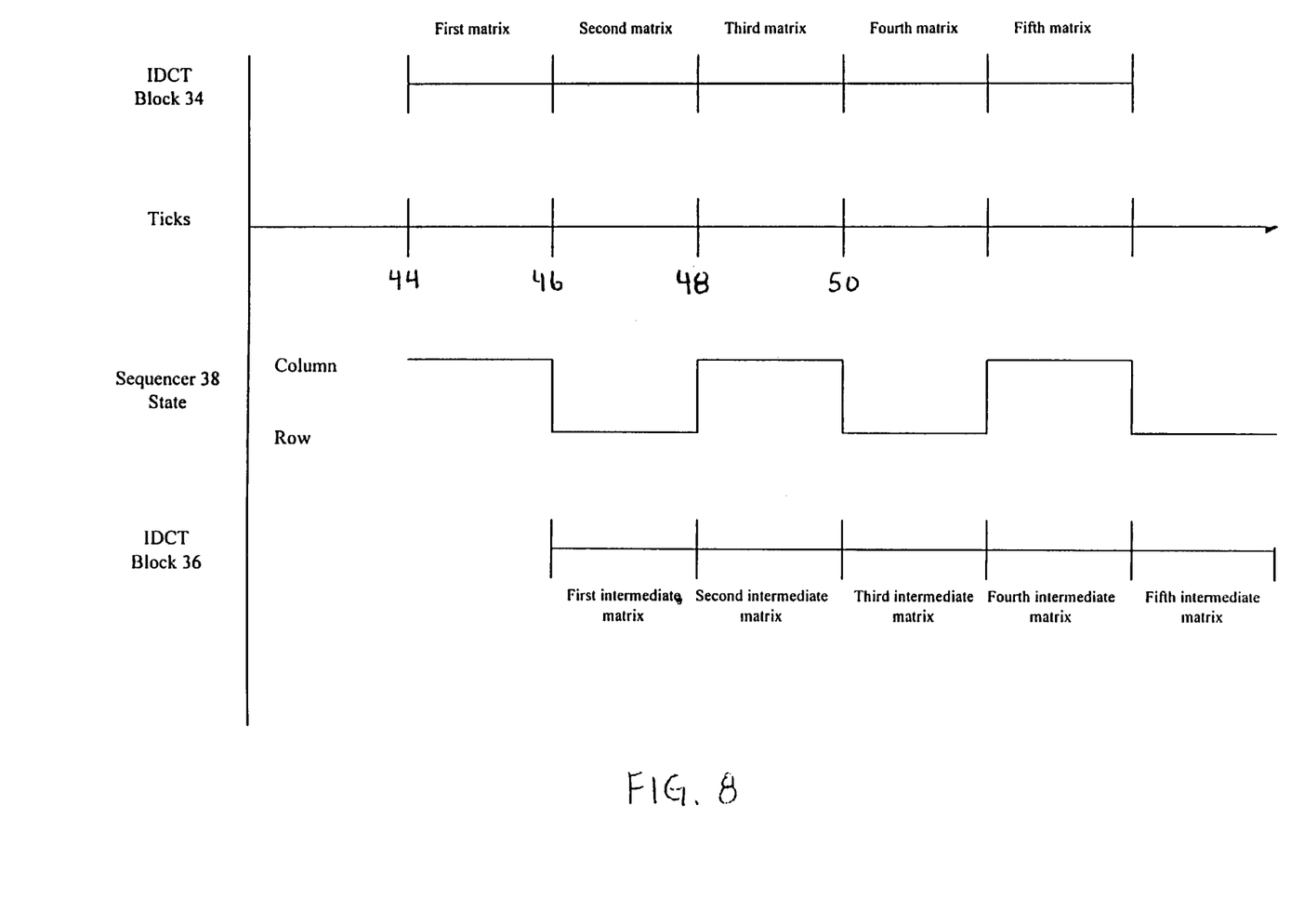
FIG. 8 is a timeline of a two-dimensional inverse discrete cosine transforming function.
Figure 9:
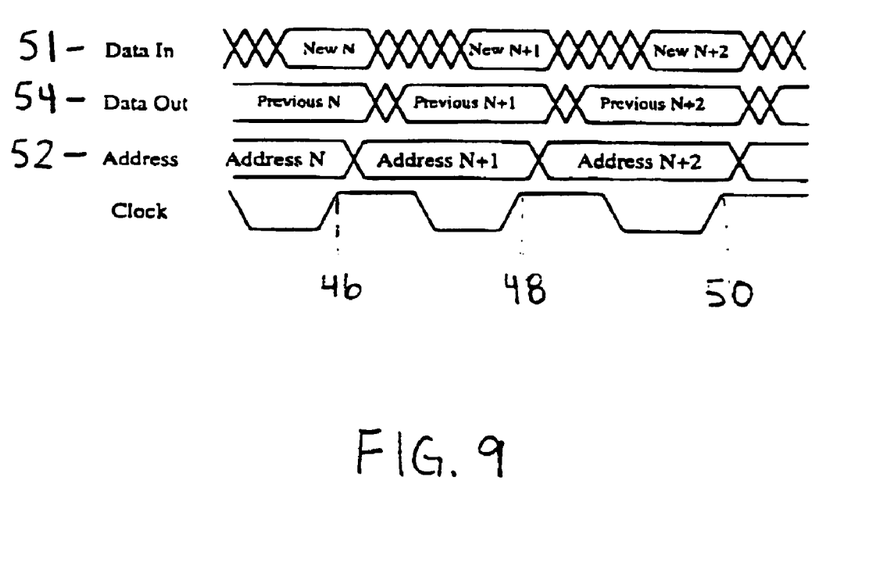
FIG. 9 is a timing diagram of a two-dimensional inverse discrete cosine transforming function.

Referring also to FIGS. 8 and 9, a method of one embodiment of the invention begins when the IDCT block 34 starts operating 51 on the first matrix in the sequence in column order at a first clock cycle 44. The IDCT block 34 operates in column order because the sequencer block 38 is initialized in a column state, though the sequencer block 38 could start in either a row state or a column state. The state of the sequencer block 38 determines which way (row or column) an address generator block 42 generates 52 addresses for IDCT blocks 34 and 36. The IDCT block 34 stores its results (the intermediate results) in RAM block 40 in the same column order, storing one intermediate result (one element) in RAM block 40 per clock cycle. At a clock cycle 46, the address generator 42 points 52 to the next row address since the sequencer 38 toggled from a column state to a row state. The IDCT block 36 starts reading and operating 54 on the intermediate results for the first matrix in row order, outputting its results (the final results) in the same row order and outputting one final result (one computed pixel) per clock cycle. The IDCT block 34 starts operating 51 on the second matrix in row order, storing its intermediate results in row order in RAM block 40. At a clock cycle 48, the sequencer block 38 toggles from a row state to a column state and the IDCT blocks 34 and 36 operate 51, 54 on their respective matrices in column order. At a clock cycle 50, the operations through clock cycles 46 to 48 begin repeating, with IDCT blocks 34 and 36 operating in parallel in alternate column order and row order until no matrices remain in the sequence.

Figure 10:
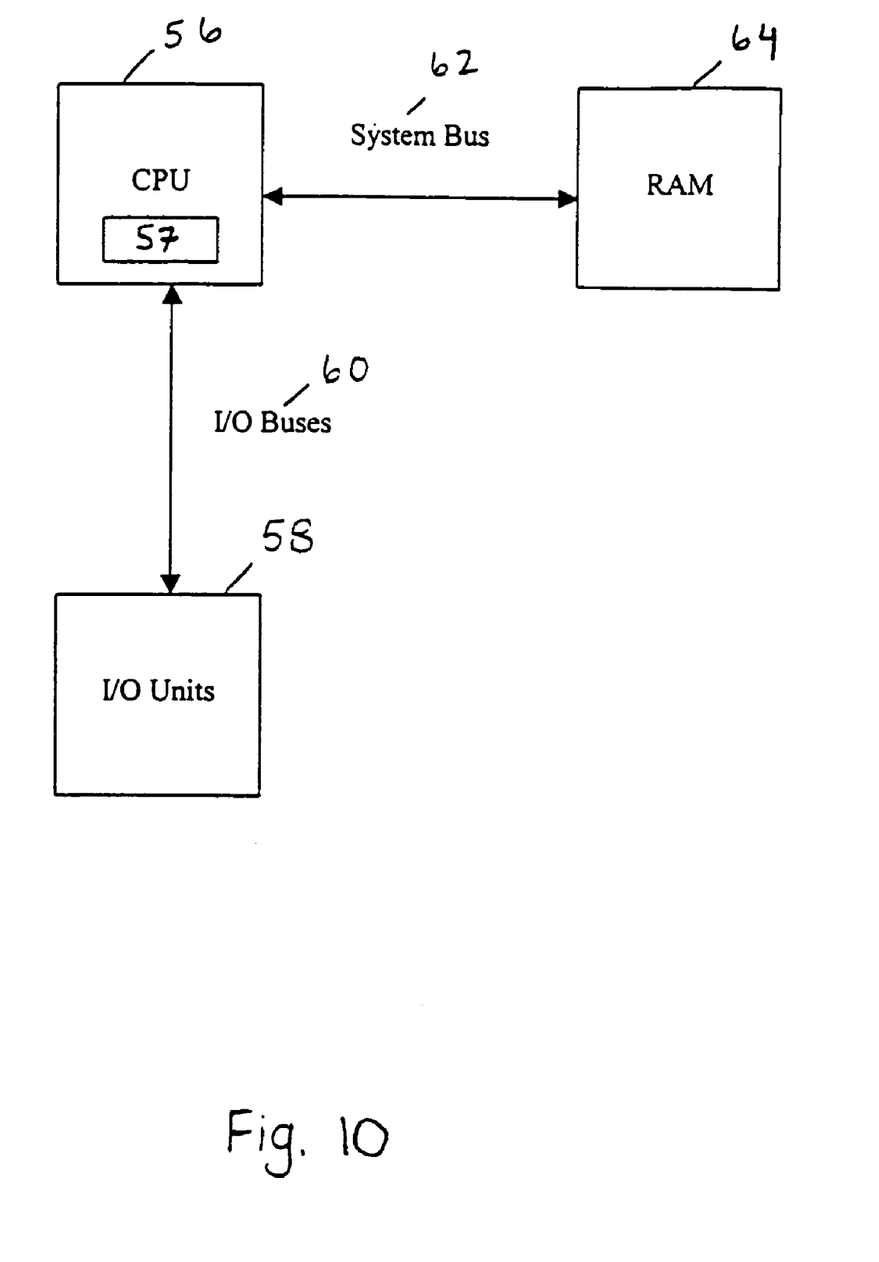
FIG. 10 is a block diagram of a computer system.

As seen in FIG. 10, a storage medium can bear a machine-readable program 57 capable of executing the method illustrated in FIGS. 7-9. Images may be stored on an input/output (I/O) unit 58, e.g., a disk drive. Buses, e.g., I/O buses 60 and system bus 62, may carry these images to memory, e.g., RAM 64. Of course, a central processing unit (CPU) 56 can emulate the RAM 64 by doing the operations in the read then store sequence described above.

Other embodiments are within the scope of the following claims.

What is claimed is:

1. A method of implementing a two-dimensional inverse discrete cosine transform, comprising:

executing first and second one-dimensional inverse discrete cosine transforming functions in first and second separate inverse discrete cosine transforming calculators, each of the first and second functions being controlled to operate on a matrix of coefficients with both of said first and second inverse discrete cosine transforming calculators operating simultaneously in a row direction at a first time, and with both of said first and second inverse discrete cosine transforming calculators operating simultaneously in a column direction at a second time.

2. The method of claim 1 further comprising a sequencer which determines which direction each function operates in for a given matrix.

3. The method of claim 1 further comprising an address generator which generates an address for each coefficient in the matrix.

4. The method of claim 1 wherein the functions concurrently executed in the same direction on two different matrices of coefficients.

5. The method of claim 1 in which the functions are concurrently executed in the same direction, the functions switching periodically and concurrently to the other direction.

6. A storage medium bearing a machine-readable program capable of causing a machine to:

execute two, one-dimensional inverse discrete cosine transforming functions in first and second inverse discrete cosine calculators, each of the functions being controlled to operate on a matrix of coefficients with both of said first and second inverse discrete cosine calculators operating simultaneously in the row direction at a first time, and with both of said first and second inverse discrete cosine calculators operating simultaneously in the column direction at a second time subsequent to said first time.

7. The medium of claim 6 in which a sequencer determines which direction each function operates in for a given matrix.

8. The medium of claim 6 in which an address generator generates an address for each coefficient in the matrix.

9. The medium of claim 6 in which the functions are concurrently executed in the same direction on two different matrices of coefficients.

10. The medium of claim 6 in which the functions are concurrently executed in the same direction, the functions switching periodically and concurrently to the other direction.

11. A method of implementing a two-dimensional inverse discrete cosine transform, comprising:

first executing a first one-dimensional inverse discrete cosine transforming function on a first inverse discrete cosine calculator, in a row direction on a first matrix of coefficients to produce a first matrix of intermediate results;

second, after said first executing, on said first inverse discrete cosine calculator, executing a second one-dimensional inverse discrete cosine transform in a column direction on a second matrix of coefficients to produce another matrix of intermediate results;

on a second inverse discrete cosine calculator, executing a third one-dimensional inverse discrete cosine transforming function in said column direction on the first matrix of intermediate results concurrent with said second executing in the column direction on said second matrix of coefficients; and periodically switching said executing between the row and column directions.

12. A method as in claim 11, wherein said second one-dimensional inverse discrete cosine transforming function and said third one-dimensional inverse discrete cosine transforming function occur concurrently in the same direction.

13. A storage medium bearing a machine-readable program capable of causing a machine to:

execute a first one-dimensional inverse discrete cosine transforming function, where the first function executes in a row direction on a first matrix of coefficients, producing a matrix of intermediate results;

execute a second one dimensional inverse discrete cosine transforming function in a column direction on a second matrix of coefficients;

execute a third one-dimensional inverse discrete cosine transforming function, where the second function executes in said column direction on the matrix of intermediate results concurrent with the execute a second function on the second matrix of coefficients, in which the functions switch periodically and concurrently between the row and column directions.

* * * * *